(12) United States Patent
Warton et al.

(10) Patent No.: US 8,840,364 B2
(45) Date of Patent: Sep. 23, 2014

(54) SYSTEM FOR ALIGNING TURBOMACHINERY

(75) Inventors: Jordan Scott Warton, Pasadena, TX (US); Robert Allen Baten, Baytown, TX (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 13/344,367

(22) Filed: Jan. 5, 2012

(65) Prior Publication Data

US 2013/0174764 A1 Jul. 11, 2013

(51) Int. Cl.
*F01D 25/00* (2006.01)

(52) U.S. Cl.
USPC .................. 415/126; 415/213.1; 415/232

(58) Field of Classification Search
CPC .............. F01D 25/285; F05D 2230/64; F05D 2230/642; F05D 2230/644; F05D 2230/68
USPC .............................. 415/126, 213.1, 214.1, 232
See application file for complete search history.

(56) References Cited

U.S. PATENT DOCUMENTS

| 3,534,430 | A | | 10/1970 | Kesling et al. |
| 4,227,281 | A | | 10/1980 | Chung et al. |
| 5,870,824 | A | * | 2/1999 | Lilja et al. ................... 29/889.1 |
| 6,793,458 | B2 | * | 9/2004 | Kawai et al. ............... 415/213.1 |
| 7,374,186 | B2 | | 5/2008 | Mason et al. |
| 8,083,471 | B2 | * | 12/2011 | Black et al. ................. 415/142 |
| 8,590,151 | B2 | * | 11/2013 | Brown et al. ................. 29/889.1 |

OTHER PUBLICATIONS

U.S. Appl. No. 13/344,350, filed Jan. 5, 2012, Jordan Scott Warton, et al.

* cited by examiner

*Primary Examiner* — Ninh H Nguyen
(74) *Attorney, Agent, or Firm* — Fletcher Yoder P.C.

(57) ABSTRACT

A system includes a turbomachine platform including a first docking guide. The turbomachine platform supports a turbomachine skid, and the skid includes a second docking guide. The first docking guide is configured to interface with the second docking guide in order to guide the turbomachine skid between a docked position and an undocked position relative to other equipment supported by the platform.

20 Claims, 5 Drawing Sheets

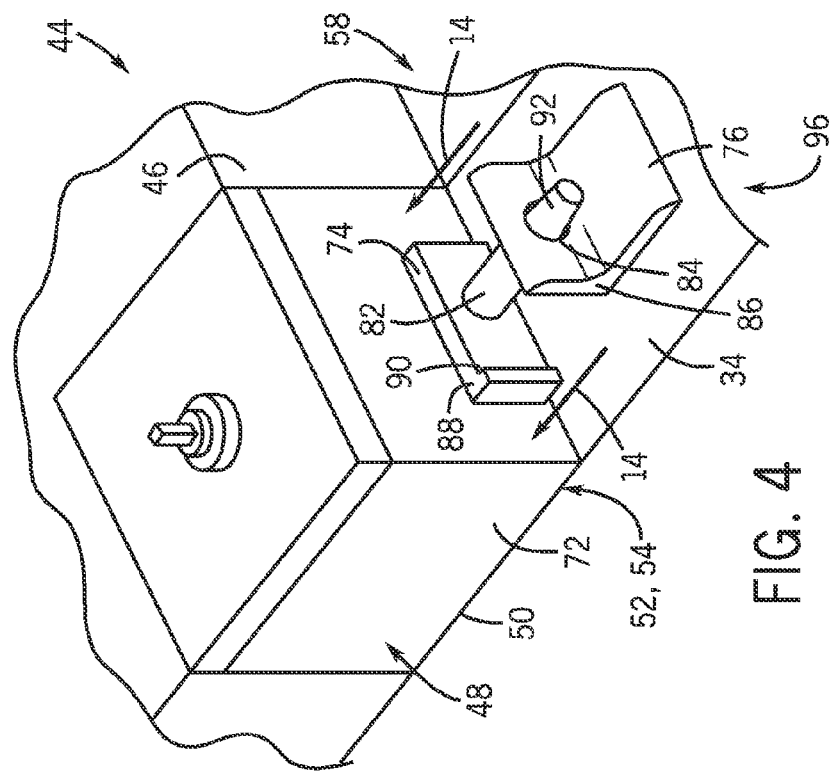
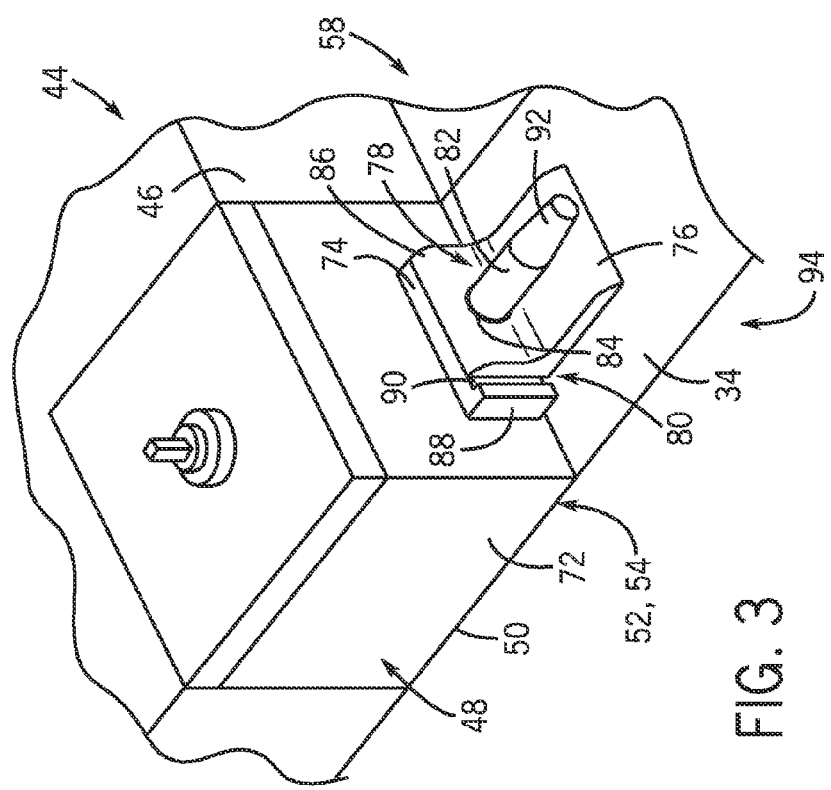

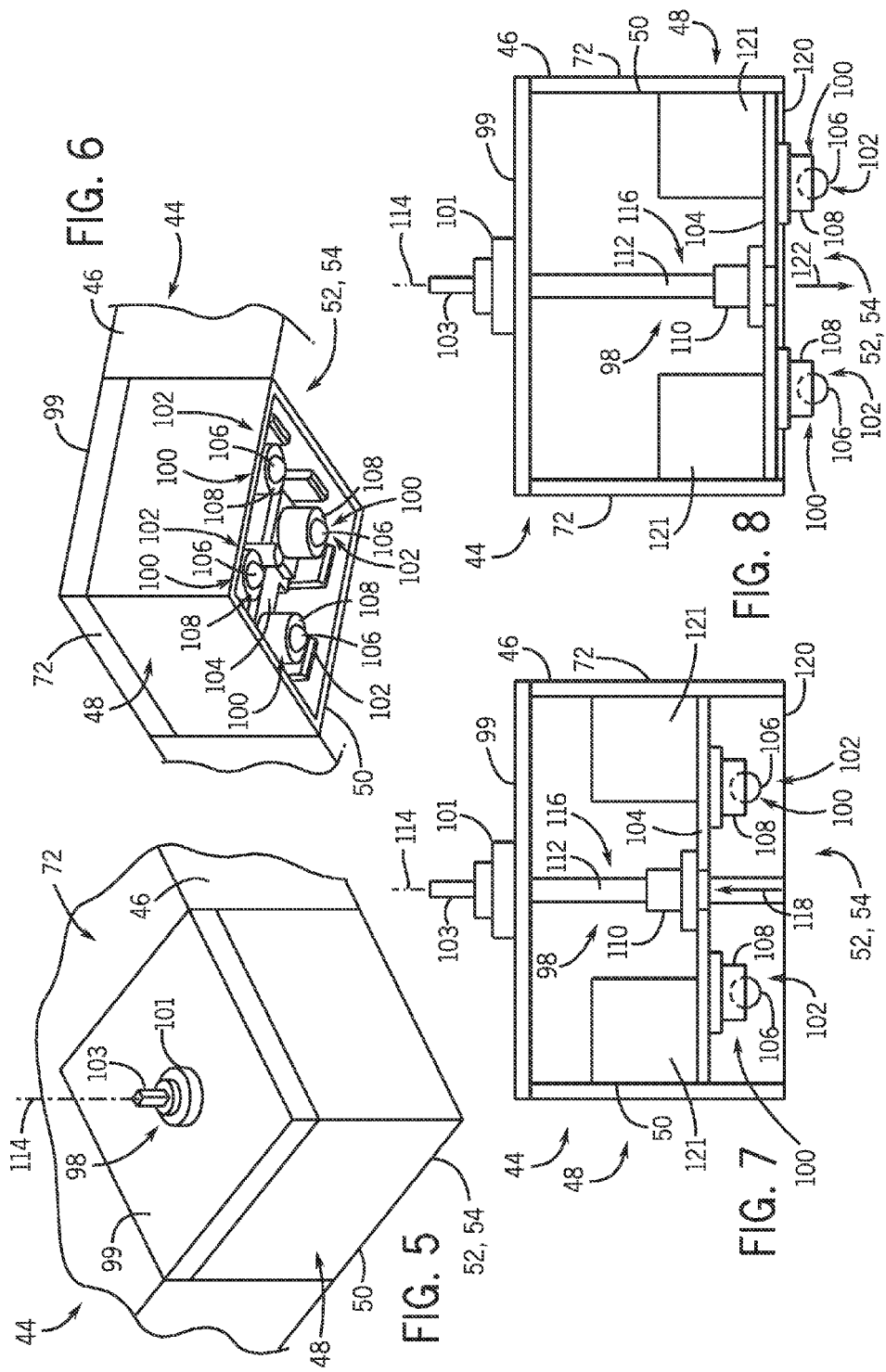

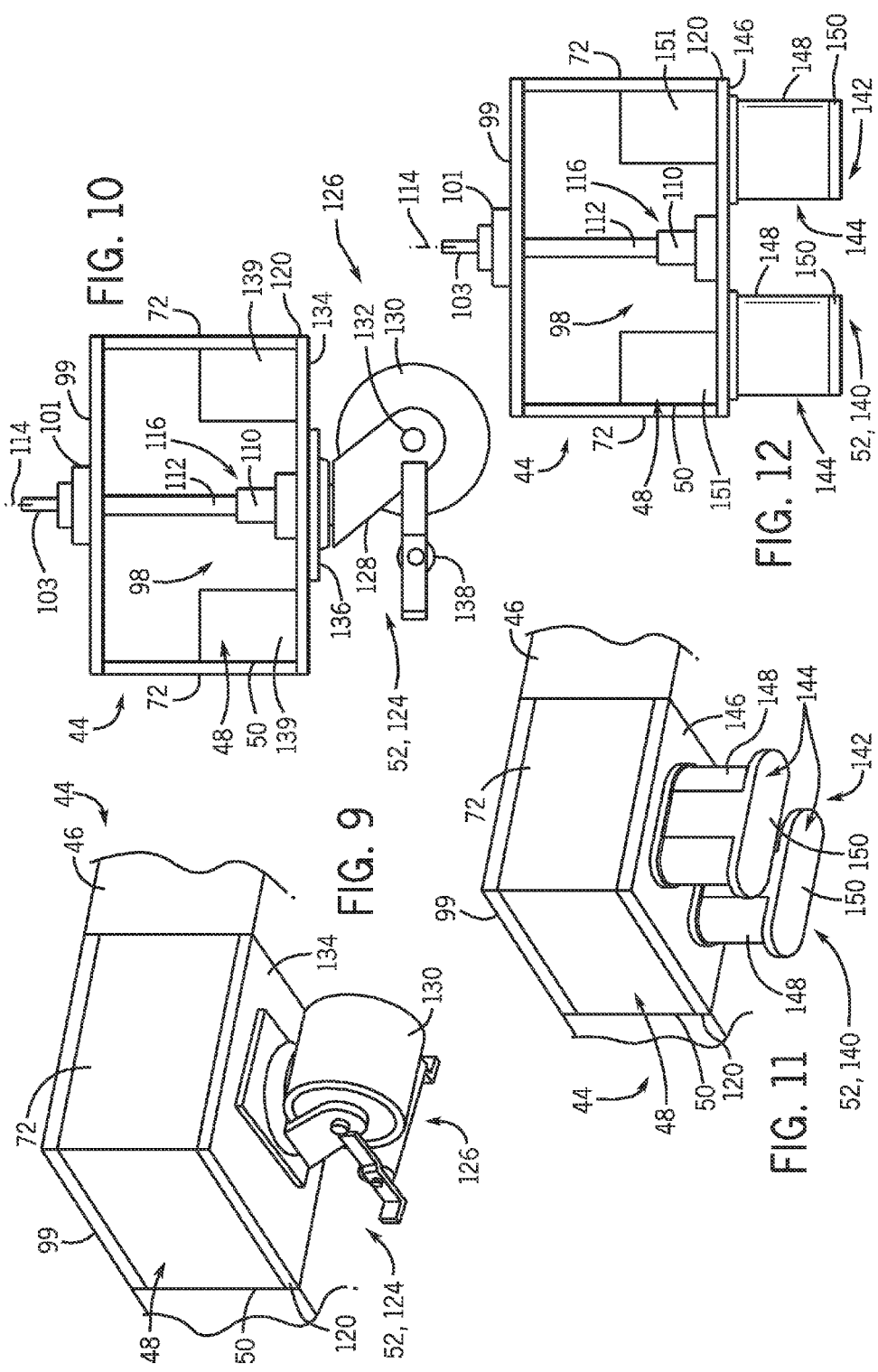

SYSTEM FOR ALIGNING TURBOMACHINERY

BACKGROUND OF THE INVENTION

The subject matter disclosed herein relates generally to turbomachines, such as turbines. More particularly, the disclose subject matter relates to a system for aligning turbomachinery, such as various sections of turbine systems.

A variety of turbomachine systems may be housed within an enclosure, such as a small building or station dedicated to the turbomachine system. For example, a turbine system, such as a gas turbine driven electrical generator, may be disposed in an enclosure having various controls, fluid lines, and associated support systems. Occasionally, one or more sections of the turbine system may require replacement or removal from the enclosure. Unfortunately, the one or more sections may be difficult to align with other components of the turbine system during removal or replacement. For example, the other components may define a relatively small area on which the one or more sections may be maneuvered during removal from the enclosure. By further example, the installation of one or more replacement sections may involve a relatively large amount of time for aligning the one or more sections with the other components. Accordingly, it may be particularly difficult to align the one or more sections within the enclosure.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine platform having a first docking guide and a turbomachine skid. The turbomachine skid includes a skid body configured to support a turbomachine and a second docking guide configured to interface with the first docking guide. The first and second docking guides are configured to guide the turbomachine skid between a docked position and an undocked position relative to equipment on the turbomachine platform.

In a second embodiment, a system includes a turbomachine platform having a first docking guide. The turbomachine plaform is configured to support a turbomachine skid, and the first docking guide is configured to interface with a second docking guide of the turbomachine skid to guide the turbomachine skid between a docked position and an undocked position relative to equipment on the turbomachine platform.

In a third embodiment, a system includes a turbomachine skid configured to move along a turbomachine platform. The turbomachine skid includes a skid body configured to support a turbomachine and a first docking guide. The first docking guide is configured to interface with a second docking guide on the turbomachine platform to guide the turbomachine skid between a docked position and an undocked position relative to equipment on the turbomachine platform.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a partial perspective view of an embodiment of the turbomachine system of FIG. 2, taken within line 3-3, illustrating a turbomachine skid secured in a docking station;

FIG. 4 is a partial perspective view of an embodiment of the turbomachine system of FIG. 2, taken within line 3-3, illustrating a turbomachine skid partially removed from the docking station;

FIG. 5 is a partial perspective view of an embodiment of the turbomachine system of FIG. 2, taken within line 3-3, illustrating a modular transportation system disposed along a corner of a turbomachine skid;

FIG. 6 is a bottom perspective view of an embodiment of the modular transportation system of FIG. 5, equipped with a precision roller transportation attachment;

FIG. 7 is a cross-sectional side view of an embodiment of the modular transportation system of FIGS. 5 and 6, equipped with the precision roller transportation attachment in a raised position;

FIG. 8 is a cross-sectional side view of an embodiment of the modular transportation system of FIGS. 5 and 6, equipped with the precision roller transportation attachment in a lowered position;

FIG. 9 is a bottom perspective view of an embodiment of the modular transportation system of FIG. 5, equipped with a rough roller transportation attachment;

FIG. 10 is a cross-sectional side view of an embodiment of the modular transportation system of FIGS. 5 and 9, equipped with the rough roller transportation attachment;

FIG. 11 is a bottom perspective view of an embodiment of the modular transportation attachment of FIG. 5, equipped with a stabilizer transportation attachment; and FIG. 12 is a cross-sectional side view of an embodiment of the modular transportation system of FIGS. 5 and 11, equipped with the stabilizer transportation attachment.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a docking station for aligning turbomachinery components on a turbomachine platform. The docking station includes a first docking guide located on a skid supporting a turbomachine and a second docking guide located on a platform supporting other turbomachinery and the skid. The first docking guide may include a tapered pin and a recess, while the second docking guide may include a tab with a hole formed therethrough. The pin may be inserted into the hole through the tab, and the tab may then be pushed into the recess in order to properly align the turbomachine on the skid with the other turbomachinery on the platform. The skid may be free to move over the platform via precision rollers attached to the bottom of the skid.

Figure 1:
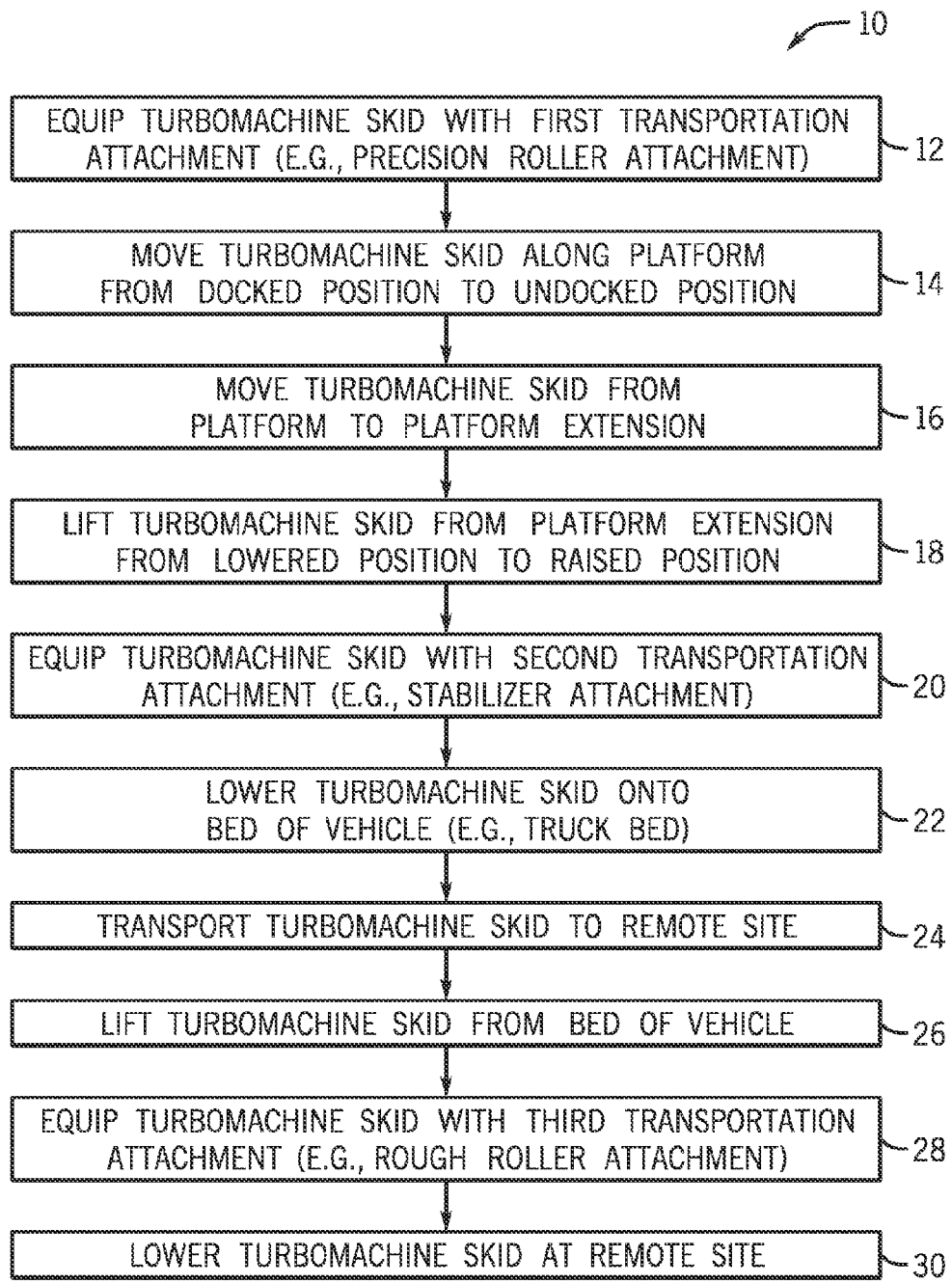
FIG. 1 is a flow chart of an embodiment of a method for transporting a turbomachine from a turbomachine platform to a remote site.

Turning now to the drawings, FIG. 1 is a block diagram of an exemplary method 10 for transporting a turbomachine (e.g., one or more sections of a turbine system) from a platform to a remote site. The turbomachine may include a gas turbine, a steam turbine, a hydroturbine, a wind turbine, or any turbine system. For example, a turbomachine skid may support a turbomachine section, such as a single stage or multi-stage compressor section, a combustor section having one or more combustors, a single stage or multi-stage turbine section, or any combination thereof. In certain embodiments, the method 10 may transport a first turbomachine from the platform to the remote site, and also install a second turbomachine on the platform to reduce downtime while the first turbomachine undergoes repairs at the remote site. Thus, the disclosed method 10 may be reversed to install a turbomachine on the platform.

The method 10 for transporting the turbomachine (e.g., one or more sections of a turbine system) includes equipping a turbomachine skid with a first transportation attachment (e.g., a precision roller attachment), as represented by block 12. The skid may support the turbomachine throughout the entire transportation process, and different transportation attachments may be coupled to the skid for each length of the journey from the platform to the remote site, or vice versa. The precision roller attachment, described in detail below, may aid the transportation of the skid, and supported turbomachine, along the platform. Once fitted with this attachment, the skid may be moved along the platform from a docked position to an undocked position, as represented by block 14. A docking station, discussed in detail below, maintains the alignment of the skid with the platform and, consequently, the alignment of the turbomachine with other components of the turbomachine system (e.g., gas turbine system) supported by the platform. The method 10 also includes moving the skid from the platform to a platform extension, as represented by block 16. The platform extension may be a structure that is removably coupled to the platform in order to support the skid as the turbomachine is transported away from the platform.

The method 10 also includes lifting the turbomachine skid from the platform extension, from a lowered position to a raised position, as represented by block 18. The skid may be lifted by a forklift or crane from its position on the platform extension. Further, the method 10 includes equipping the turbomachine skid with a second transportation attachment (e.g., stabilizer attachment), as represented by block 20. Still further, the method 10 includes lowering the turbomachine skid onto the bed of a vehicle (e.g., truck bed), as represented by block 22, and transporting the turbomachine skid to the remote site, as represented by block 24. The stabilizer attachments may act as shock absorbers, thereby helping to reduce movement or vibration of the turbomachine while on the bed of a truck or other vehicle traveling over rough terrain.

Once at the remote site, the turbomachine skid may be lifted from the bed of the vehicle, as represented by block 26, and equipped with a third transportation attachment (e.g., a rough roller attachment), as represented by block 28. As before, the skid may be lifted by a forklift or crane, depending on the size of the turbomachine and the available equipment. The rough roller attachment may be a caster wheel or other attachment that allows for movement of the skid about a relatively open area, such as a shop floor. Finally, the method includes lowering the turbomachine skid at the remote site, as represented by block 30. From this position, the turbomachine may be transported about a shop floor of the remote site in order to receive maintenance before being returned to a turbomachine platform (e.g., gas turbine platform).

It should be noted that the method 10 of transporting a turbomachine from a platform to a remote site may also be applied in reverse. That is, a turbomachine may be transported from a remote site to a platform using similar techniques of lifting, lowering, and changing the transportation attachments on a turbomachine skid. The method 10 may be applied in other orders as well, depending on where and how the turbomachine requires transportation. For example, a skid may be removed from a turbomachine platform to a platform extension using precision roller attachments, lifted from the platform extension by a forklift or crane, equipped with rough roller attachments, and lowered to a surface along which the skid may be permitted to roll.

Figure 2:
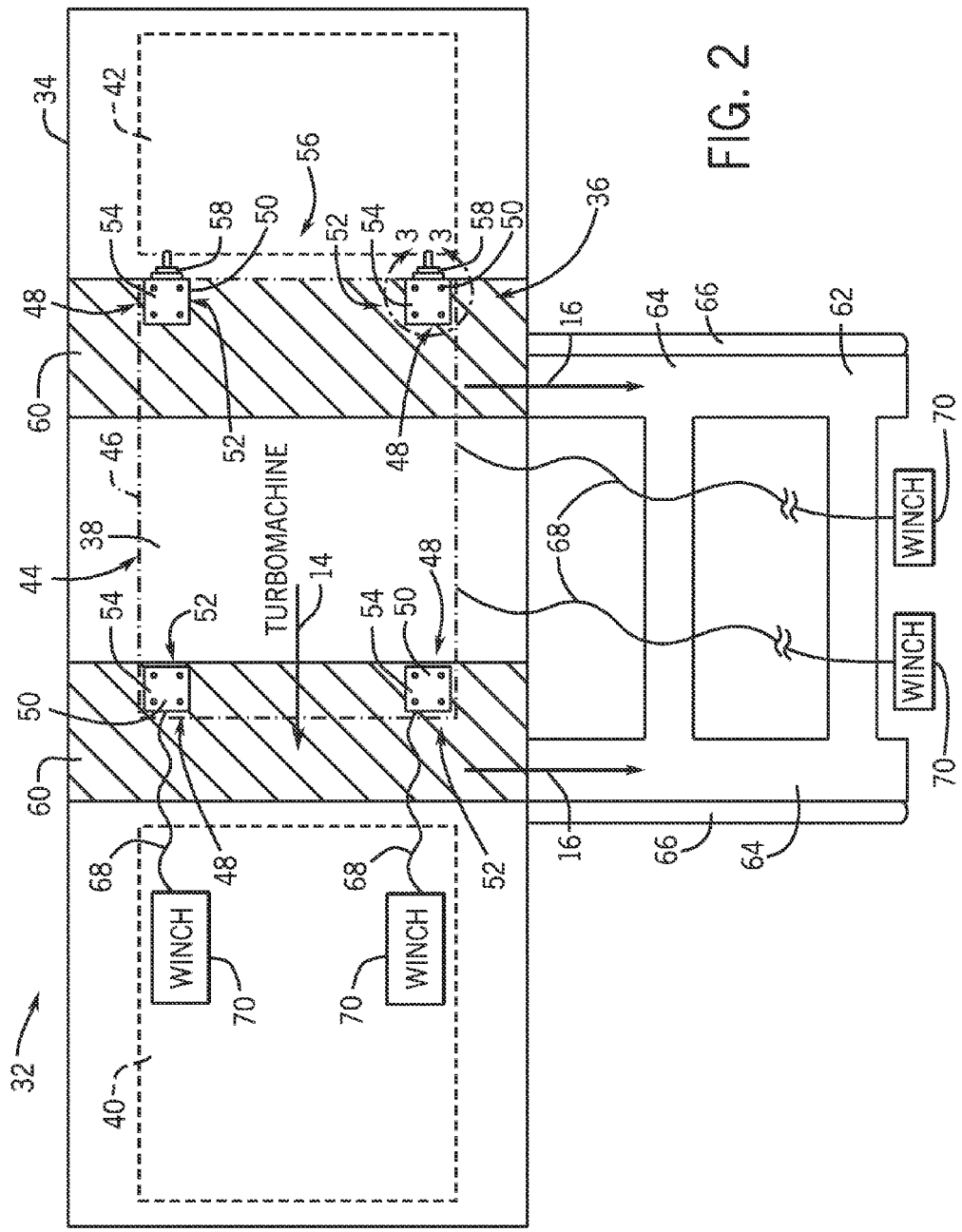
FIG. 2 is a schematic top view of an embodiment of a turbomachine system having a turbomachine disposed on a turbomachine platform, illustrating a path of movement of a turbomachine skid along the platform.

FIG. 2 is a schematic top view of certain components of a turbomachine system 32 being removed from a turbomachine platform 34. In the illustrated embodiment, the turbomachine system 32 is a gas turbine system, and the platform 34 is a gas turbine platform. However, the system 32 and platform 34 may include any type of turbomachine. Nevertheless, the following discussion presents embodiments of a modular transportation system 36 in the context of a gas turbine system. The components being removed form a turbomachine 38 (e.g., at least part of a gas turbine engine), which may include a single or multi-stage gas compressor, a single or multi-stage turbine, one or more combustors, or a combination thereof. In the illustrated embodiment, other turbomachine components 40 and 42 (e.g., gas turbine components) are fixed to the platform 34 on opposite sides of the turbomachine 38. For example, the first turbomachine component 40 may be an air intake section and/or one or more front stages of a compressor, and the second turbomachine component 42 may be a combustor outlet, a power turbine, or an exhaust section. All components of the turbomachine system 32, including the turbomachine 38 to be transported, may be disposed relatively close to each other on the platform 34. As discussed below, the modular transportation system 36 is configured to facilitate installation and removal of the turbomachine 38 relative to the platform 34, while also providing flexibility or modularity in transporting the turbomachine 38 in a plurality of contexts.

The turbomachine 38 is supported by a turbomachine skid 44, which may be a platform or pallet separate from the platform 34. For example, the skid 44 may be approximately 2 to 10 meters in length and width, and the skid 44 is configured to move independently from the platform 34. The illustrated skid 44 has a skid body 46 in addition to the modular transportation system 36 with one or more supports 48 (e.g., 4 to 20 supports 48), which may include receptacles 50 configured to selectively hold a plurality of different transportation attachments 52. For example, the modular transportation system 36 may include a support 48 having a transportation attachment 52 in each corner (e.g., four corners) of the skid body 46. In this way, the skid 44 may be equipped with at least one transportation attachment 52 to allow movement of the skid 44 relative to the platform 34. In the illustrated embodiment, the transportation attachments 52 include precision roller transportation attachments 54. For example, a precision roller attachment 54 may be removably coupled to each support 48 (e.g., four attachments 54 for four supports 48). Other numbers and arrangements of precision roller attachments 54 may be possible and appropriate for transportation of the skid 44. For instance, more precision roller attachments 54 may be coupled to a relatively larger skid 44 for distributing the total weight of the skid 44 and turbomachine 38 more evenly across the platform 34. The precision roller attachments 54 may be arrangements of one or more spherical wheels or omni-directional rollers designed to facilitate relatively precise movement of the skid 44 across a flat smooth surface. Such precision may be useful for positioning the skid 44 properly on the platform 34, since the turbomachine 38 atop the skid 44 may undergo precision alignment with the other turbomachine components 40 and 42 in order for the turbomachine system 32 to operate.

The illustrated system 32 includes a docking system 56 with one or more docking stations 58 disposed on the platform 34 for aligning the skid 44 and supported turbomachine 38 with the other turbine components 40 and 42. In the illustrated embodiment, two docking stations 58 on the right side of the skid 44 guide the skid 44 from an undocked position to a docked position, which aligns the turbomachine 38 with the other turbine components 40 and 42 on the platform 34. However, the docking system 56 may include other numbers and arrangements of docking stations 58. For example, two additional docking stations 58 may be located to the right of the two precision roller attachments 54 shown on the left side of the skid 44.

The method 10 of FIG. 1 included moving the skid 44 from a docked position to an undocked position on the platform 34. In FIG. 2, an arrow illustrates this step 14, showing the movement of the skid 44 away from the docking stations 58. The precision roller attachments 54 allow the skid 44 to move across the platform 34 in this way. One or more smooth plates 60 may be disposed on the platform 34 to provide a flat smooth surface upon which the precision roller attachments 54 are permitted to roll, carrying the skid 44 from the docked position to the undocked position. The smooth plates 60 may be stainless steel or any other suitable material. Although the illustrated embodiment shows two smooth plates 60, other numbers and layouts of smooth plates 60 are possible depending on the number and relative placement of precision roller attachments 54 on the skid 44.

As described in FIG. 1, the method 10 of moving the turbomachine 38 away from the platform 34 also involves moving the skid 44 from the platform 34 to a platform extension 62. This step is illustrated by the arrow 16 in FIG. 2, which shows the movement of the skid 44 off the platform 34 and onto the platform extension 62. The platform extension 62 may be removably coupled to the platform 34, allowing the platform extension 62 to be added when the skid 44 needs to be removed from or loaded onto the platform 34. The top surface of the platform extension 62 may be smooth (e.g., smooth plates 64), allowing the precision roller attachments 54 to easily move along the top of the platform extension 62. The platform extension 62 also may include braces 66 along the sides of the platform extension 62 to help contain and guide the skid 44 while rolling along the platform extension 62. The skid 44, which supports the turbomachine 38, may be pulled toward the platform extension 62 with cables 68 attached to the skid 44. Such cables 68 may extend from winches 70 positioned adjacent the platform extension 62 and configured to reel in the cables 68 when turned, either manually or by one or more motors. Similar cables 68 extending from winches 70, positioned on the platform 34 opposite the docking stations 58, may be used to move the skid 44 away from a docked position within the docking stations 58 to an undocked position on the platform 34. Alternatively, these operations may be performed in reverse by positioning the winches 70 and cables 68 opposite the platform extension 62 and adjacent the docking stations 58. In this way, the skid 44 may be pulled from the platform extension 62 to the platform 34 and from an undocked position to a docked position in the docking stations 58.

Once the skid 44 is completely moved onto the platform extension 62, a forklift or crane may be attached to the skid 44 in order to lift the skid 44 and the supported turbomachine 38 to a raised position. If a forklift is used, the forks may be inserted into slots within the skid 44. If a crane is used, hooks extending from the crane may be placed through eyes built into the sides of the skid 44. Once the skid 44 is lifted into a raised position, by whichever method, the precision roller attachments 54 may be removed and replaced with different transportation attachments 52. For example, the different interchangeable transportation attachments 52 may include stabilizers, or one or more rollers, which may be a spherical wheel, an omni-directional roller (e.g., the precision roller transportation attachment 54), or an annular wheel (e.g., rough roller attachment). These different transportation attachments 52 may allow the modular transportation system 36 to be changed between many different transportation configurations.

FIGS. 3 and 4 are partial perspective views of the system 32 of FIG. 2, taken within line 3-3. As illustrated, FIGS. 3 and 4 show an embodiment of the docking station 58 of FIG. 2. The docking station 58 may guide a corner 72 (or another portion) of the skid 44 from an undocked position to a docked position on the platform 34. In this docked position, the skid 44 may be secured (e.g., bolted) to the platform 34 and the turbomachine 38 may be coupled to the other components 40 and 42. The docking station 58 may include a first docking guide 74 located on the corner 72 of the skid 44, and a second docking guide 76 located on the platform 34. As illustrated in FIG. 2, there may be a first pair of docking guides 74 and 76 and a second pair of docking guides 74 and 76, each pair located at different corresponding locations of the skid 44 and the platform 34. For example, the skid 44 may be equipped with a pair of first docking guides 74 configured to interface with a corresponding pair of second docking guides 76 positioned on the turbomachine platform 34.

The docking guides 74 and 76 are configured to interface with one another with at least one male-female connection, such as first and second male-female connections 78 and 80. The first docking guide 74 may include a pin 82 that is designed to fit in a hole 84 formed through a tab 86 of the second docking guide 76, thereby defining the first male-female connection 78. The first docking guide 74 may also include a flanged base 88 having a recess 90 configured to receive the tab 86, thereby defining the second male-female connection 80. The pin 82 may feature a tapered end 92 for a more guided insertion into the hole 84 through the tab 86. The length of the pin 82 may be greater than the distance between the turbomachine 38 supported on the skid 44 and the adjacent turbomachine component 42 (e.g., 1.1 to 3 times the distance). This may ensure that the turbomachine 38 comes into alignment with the adjacent turbomachine component 42 before contacting the component. FIG. 3 illustrates the docking station 58 while the skid 44 is in a fully docked position 94, and FIG. 4 illustrates the movement of the skid 44 from the docked position 94 to an undocked position 96, as indicated by the arrows 14. As illustrated, the guides 74 and 76 are configured to facilitate alignment between the skid 44, the platform 34, and the components 40 and 42 to more efficiently and accurately install and remove the turbomachine 38.

FIG. 5 is a top perspective view of the corner 72 of the skid 44 of FIG. 2, taken within line 3-3, illustrating the transportation attachment 52, 54 coupled to the support 48 of the modular transportation system 36. The corner 72 has the support 48 configured to support various interchangeable transportation attachments 52, such as the precision roller attachment 54, in the receptacle 50. Once the transportation attachment 52 is inside the receptacle 50, the support 48 at least partially surrounds the desired transportation attachment 52. In certain embodiments, the receptacle 50 may feature an upper wall 99, which may be removable to provide access to the inside of the receptacle 50, such that the attachment 52, 54 may be changed to another attachment 52 without lifting the skid 44. The transportation attachments 52 may be selectively coupled to a portion of the receptacle 50 with a removable mounting assembly 98, such as an ACME screw assembly, which may include a bearing support 101 and a tool-engageable head 103 coupled with the upper wall 99, as discussed in detail below.

FIG. 6 is a bottom perspective view of the corner 72 of the skid 44 of FIG. 2, taken within line 3-3, illustrating the transportation attachment 52, 54 coupled to the support 48 of the modular transportation system 36. As discussed above, the receptacle 50 is equipped with the precision roller attachment 54 to facilitate precision movements along the platform 34 and/or the platform extension 62. In the illustrated embodiment, the precision roller attachment 54 includes a plurality of omni-directional precision rollers 100, such as four ball transfer units 102, coupled to a lower wall 104. In turn, the lower wall 104 is coupled to a lead screw, such that the screw assembly 98 may be operated to raise and lower the lower wall 104, and thus raise and lower the four ball transfer units 102. Each ball transfer unit 102 includes a sphere 106 disposed partially in a restraining fixture 108, and the spheres 106 are permitted to rotate freely within the restraining fixture 108 in any direction (i.e., omni-directional). Thus, when the spheres 106 of the precision roller attachment 54 contact a surface (e.g., the smooth plate 60), the spheres 106 may roll in any direction along the surface, carrying the attached skid 44 across the surface. The spheres 106, each with a relatively small contact point and three axes of rotation, allow the skid 44 to move and change direction along the smooth plate 60 with relatively high precision. Therefore, the precision roller attachment 54 may be beneficial for moving a turbomachine 38 along the platform 34 and platform extension 62.

FIGS. 7 and 8 are cross-sectional side views of the corner 72 of the skid 44 of FIG. 2, taken within line 3-3, illustrating the transportation attachment 52, 54 coupled to the support 48 of the modular transportation system 36. As illustrated, the screw assembly 98 includes an ACME nut 110 coupled with the lower wall 104 and an ACME lead screw 112 extending through the receptacle 50 and supported by the bearing support 101 on the upper wall 99. The vertical displacement of the nut 110 may be adjusted by turning the threaded lead screw 112 via the tool-engageable head 103, which may be turned using a tool (e.g., wrench). The bearing support 101 may allow rotation of the lead screw 112 about the axis 114 without translating the lead screw 112 along the direction of the axis 114. As the lead screw 112 is turned, the nut 110, which may be threaded onto the lead screw 112 in fixed orientation with respect to the axis 114, may be forced to travel up or down the lead screw 112 in order to maintain its orientation. In this way, the screw assembly 98 may be used to adjust the height of the transportation attachment 52 relative to the skid body 46.

In particular, FIGS. 7 and 8 illustrate a height adjustable feature 116 (e.g., threaded connection between the nut 110 and screw 112) of the screw assembly 98, which removably secures and provides height adjustment of the precision roller attachment 54 within the receptacle 50 of the support 48. FIG. 7 illustrates the precision roller attachment 54 with the ball transfer units 102 in a raised position or retracted position within the receptacle 50, whereas FIG. 8 illustrates the precision roller attachment 54 with the ball transfer units 102 in a lowered position or extended position below the receptacle 50 and, therefore, below the base of the skid body 46. For example, as illustrated by FIG. 7, the height adjustable feature 116 of the screw assembly 98 may be used to raise the ball transfer units 102 from the lowered position to the raised position as indicated by arrow 118, such that the spheres 106 do not extend beyond a bottom surface 120 of the receptacle 50. In this raised position, the bottom surface 120 rests on the platform 34 such that the precision roller attachment 54 is disabled, thereby substantially inhibiting movement of the skid 44 along the platform 34. A plurality of guiding panels 121 may be connected to the lower wall 104 to guide the transportation attachment 52, 54 vertically along the receptacle 50 (e.g., along axis 114) to maintain alignment (e.g., avoid twisting or binding) as the height adjustable feature 116 raises or lowers the transportation attachment 52, 54.

As illustrated by FIG. 8, the height adjustable feature 116 of the screw assembly 98 may be used to lower the ball transfer units 102 from the raised position to the lowered position as indicated by arrow 122, such that the spheres 106 extend beyond the bottom surface 120 of the receptacle 50. For example, the screw 112 may be turned to lower the nut 110 and the lower wall 104, thereby lowering the ball transfer units 102 until the spheres 106 extend beyond the bottom surface 120. In this lowered position, the ball transfer units 102 may allow the skid 44 to be maneuvered across the platform 34. The height adjustable feature 116 of the screw assembly 98 may have a variety of height adjustable ranges. For example, a skid 44 supporting a turbomachine 38 weighing approximately 1,000 to 10,000 pounds may only need an elevation of approximately 1 to 5 millimeters above the platform 34 in order for a person to maneuver the skid 44 and turbomachine 38. In the illustrated embodiment of FIGS. 2 and 5 to 8, the skid 44 includes a total of sixteen ball transfer units 102, i.e., four precision roller attachments 54 each having four ball transfer units 102. However, other embodiments may include 1 to 10 or more ball transfer units 102 per precision roller attachment 54, and 1 to 10 or more precision roller attachments 54 per skid 44.

FIGS. 9 and 10 are bottom perspective and cross-sectional views of the corner 72 of the skid 44 of FIG. 2, taken within line 3-3, illustrating an embodiment of the transportation attachment 52 (e.g., rough roller transportation attachment 124) coupled to the support 48 of the modular transportation system 36. Similar to the precision roller attachment 54, the rough roller transportation attachment 124 may be removably coupled to the receptacle 50 of the support 48 to aid in transportation of the turbomachine 38. The illustrated rough roller attachment 124 includes a caster wheel assembly 126 having an arm 128 supporting a caster wheel 130 (e.g., a cylindrical or annular wheel) at a rotational joint 132. The caster wheel assembly 126 also couples to a lower wall 134 at a joint 136, which may be a fixed joint or a rotational joint. For example, the joint 136 may be a rotational joint having a rotational axis along the axis 114 of the screw 112, such that the caster wheel assembly 126 has two degrees of freedom to rotate. This allows for motion in all directions across a surface, such as a shop floor, although the movement may be less precise than the movement available with the omni-directional precision roller attachment 54. As compared with the precision roller attachment 54, the caster wheel 130 of the rough roller attachment 124 allows for larger movements of the skid 44 along a surface, such as a shop floor, where the supported turbomachine 38 may be maintained. For example, a diameter of the caster wheel 130 may be substantially larger (e.g., 1.5 to 10 times larger) than the diameter of the spheres 106 of the ball transfer units 102. The larger diameter of the caster wheel 130 may be selected to account for a greater roughness and/or a greater distance of travel expected along a shop floor or other location, as compared to the smooth surface and small distance expected for the precision roller attachment 54. As further illustrated in FIG. 10, the caster wheel assembly 126 may include a brake 138 to selectively disable the caster wheel 130, thereby holding the wheel 130 and thus the skid 44 in a stationary position.

In certain embodiments, the rough roller attachment 124 may include or exclude height adjustable features, such as the height adjustable feature 116. For example, the lower wall 134 and attached caster wheel assembly 126 may be height adjustable via the screw assembly 98, using guiding panels 139 connected to the lower wall 134 to guide the transportation attachment 124 as it is raised and lowered, or the lower wall 134 and attached caster wheel assembly 126 may be fixed in position with the caster wheel 130 extending below the bottom surface 120. In either configuration, the screw assembly 98 may be used to selectively couple the rough roller attachment 124 to the receptacle 50 of the support 48. Furthermore, in either configuration, the skid 44 may be lifted by a forklift or crane to enable swapping of the transportation attachments 52, e.g., the precision roller attachment 54, the rough roller attachment 124, and a stabilizer transportation attachment 140.

FIGS. 11 and 12 are bottom perspective and cross-sectional views of the corner 72 of the skid 44 of FIG. 2, taken within line 3-3, illustrating an embodiment of the transportation attachment 52 (e.g., stabilizer transportation attachment 140) coupled to the support 48 of the modular transportation system 36. Similar to the precision roller attachment 54 and the rough roller attachment 124, the stabilizer transportation attachment 140 may be removably coupled to the receptacle 50 of the support 48 to aid in transportation of the turbomachine 38. In the illustrated embodiment, the stabilizer transportation attachment 140 includes a leg assembly or stabilization assembly 142 having one or more stabilizers 144 (e.g., 1, 2, 3, 4, 5, or more) coupled to a lower wall 146. For example, the stabilizers 144 may function to level the skid 44, focus the load of the turbomachine 38 at discrete points, and absorb shock or vibration during transportation of the skid 44 on a vehicle (e.g., a bed of a truck, locomotive, ship, or the like). Thus, the stabilizers 144 may include a vibration dampening or energy dissipating material, a shock absorption assembly (e.g., one or more springs, hydraulic pistons, pressurized chambers, etc.), or any combination thereof. For example, each stabilizer 144 may include a stabilizer leg 148 made at least partially or entirely of a metal, a plastic, a rubber, an elastomeric material, or any combination thereof. Each stabilizer 144 also includes a bottom portion or base 150, which may include a textured surface with protrusions to help retain the leg 148 in position along a surface (e.g., a bed of a vehicle). While installed on the skid 44, the stabilizer transportation attachments 140 may substantially reduce movement and shock of the turbomachine 38 supported on the skid 44 during transportation from one site to another (e.g., between the platform 34 and a remote site).

In certain embodiments, the stabilizer attachment 140 may include or exclude height adjustable features, such as the height adjustable feature 116. For example, the lower wall 146 and attached stabilizers 144 may be height adjustable via the screw assembly 98, using guiding panels 151 connected to the lower wall 146 to guide the transportation attachment 140 as it is raised and lowered, or the lower wall 146 and attached stabilizers 144 may be fixed in position with the stabilizers 144 extending below the bottom surface 120. In either configuration, the screw assembly 98 may be used to selectively couple the stabilizer attachment 140 to the receptacle 50 of the support 48. Furthermore, in either configuration, the skid 44 may be lifted by a forklift or crane to enable swapping of the transportation attachments 52, e.g., the precision roller attachment 54, the rough roller attachment 124, and the stabilizer attachment 140.

Technical effects of the invention include, among other things, allowing a user to align a turbomachine on a platform supporting other turbomachine components. One or more docking stations guide a turbomachine skid into proper alignment while preventing the turbomachine from forcefully contacting the other turbomachine components. Precision roller attachments located on the skid allow the skid to be maneuvered into the docking station, potentially saving time during both removal and installation of turbomachinery.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbomachine platform having a first docking guide; and
a turbomachine skid, comprising:
a skid body configured to support a turbomachine; and
a second docking guide configured to interface with the first docking guide, wherein the first and second docking guides are configured to guide the turbomachine skid between a docked position and an undocked position relative to equipment on the turbomachine platform.

2. The system of claim 1, comprising the turbomachine disposed on the skid body.

3. The system of claim 2, wherein the turbomachine comprises at least one component of a turbine system.

4. The system of claim 1, wherein the first and second docking guides comprise at least one male-female connection.

5. The system of claim 4, wherein the at least one male-female connection comprises a pin disposed in a hole.

6. The system of claim 5, wherein the pin comprises a tapered pin.

7. The system of claim 4, wherein the at least one male-female connection comprises a tab disposed in a recess.

8. The system of claim 1, comprising a first pair of the first and second guides and a second pair of the first and second guides.

9. The system of claim 1, wherein the turbomachine skid comprises a plurality of rollers coupled to the skid body.

10. The system of claim 9, wherein the turbomachine platform comprises at least one smooth plate supporting the plurality of rollers.

11. The system of claim 10, wherein the plurality of rollers comprises a plurality of omni-directional spherical wheels.

12. The system of claim 10, comprising a platform extension removably coupled to the turbomachine platform.

13. A system, comprising:
a turbomachine platform having a first docking guide, wherein the turbomachine plaform is configured to support a turbomachine skid, and the first docking guide is configured to interface with a second docking guide of the turbomachine skid to guide the turbomachine skid between a docked position and an undocked position relative to equipment on the turbomachine platform.

14. The system of claim 13, wherein the turbomachine platform comprises a first component of a turbine system, and the turbomachine skid is configured to support a second component of the turbine system.

15. The system of claim 13, wherein the first docking guide is configured to interface with the second docking guide with at least one male-female connection.

16. The system of claim 15, wherein the at least one male-female connection comprises a pin disposed in a hole, a tab disposed in a recess, or a combination thereof.

17. The system of claim 13, wherein the turbomachine platform comprises at least one smooth plate configured to support a plurality of rollers on the turbomachine skid, and the turbomachine platform comprises a pair of the first docking guides configured to interface with a pair of the second docking guides on the turbomachine skid.

18. A system, comprising:
a turbomachine skid configured to move along a turbomachine platform, wherein the turbomachine skid comprises:
a skid body configured to support a turbomachine; and
a first docking guide configured to interface with a second docking guide on the turbomachine platform to guide the turbomachine skid between a docked position and an undocked position relative to equipment on the turbomachine platform.

19. The system of claim 18, wherein the turbomachine comprises at least one component of a turbine system.

20. The system of claim 18, wherein the turbomachine skid comprises a plurality of rollers coupled to the skid body, and the turbomachine skid comprises a pair of the first docking guides configured to interface with a pair of the second docking guides on the turbomachine platform.

* * * * *